US005524979A

United States Patent [19]

Carson et al.

[11] Patent Number: 5,524,979

[45] Date of Patent: Jun. 11, 1996

[54] OVERHEAD STORAGE MECHANISM

[75] Inventors: Scott S. Carson, Huntingburg; Jay M. Henriott, Jasper, both of Ind.

[73] Assignee: Kimball International, Inc., Jasper, Ind.

[21] Appl. No.: 257,819

[22] Filed: Jun. 9, 1994

[51] Int. Cl.[6] .............................. A47B 88/00; E05F 5/02; F16F 9/14

[52] U.S. Cl. ............................ 312/319.2; 16/82; 188/290

[58] Field of Search .................................... 312/219, 245, 312/319.1, 319.2, 323, 107.5; 16/80, 82; 70/77, 78, 84, 85, 86, 91, 103, 95, 96, 99; 188/290, 310

[56] References Cited

U.S. PATENT DOCUMENTS

| | | | |
|---|---|---|---|
| Re. 28,994 | 10/1976 | Aylworth | 312/245 |
| 1,451,207 | 4/1923 | Draper | 312/319.2 X |
| 1,910,156 | 5/1933 | Ericson | 312/219 X |
| 2,187,320 | 1/1940 | Hoffstetter et al. | 312/319.2 X |
| 4,057,307 | 11/1977 | Scheerhorn | 312/107.5 |
| 4,445,729 | 5/1984 | Scheerhorn | 312/219 |
| 4,457,569 | 7/1984 | Scheerhorn | 312/219 |
| 4,516,813 | 5/1985 | Sekerich | 312/323 |
| 4,591,214 | 5/1986 | Reuter et al. | 312/110 |
| 4,600,254 | 7/1986 | Whalen | 312/323 |
| 4,725,108 | 2/1988 | Wilson | 312/323 |
| 4,938,322 | 7/1990 | Sugasaware et al. | 188/290 |
| 5,079,797 | 1/1992 | Ohshima et al. | 16/82 |
| 5,222,790 | 6/1993 | Latino | 312/315 |
| 5,353,899 | 10/1994 | Ohshima | 188/310 |

FOREIGN PATENT DOCUMENTS

| | | | |
|---|---|---|---|
| 1121697 | 8/1956 | France | 312/319.2 |

OTHER PUBLICATIONS

Instruction Sheet for Sugatsune Lid Stay.

*Primary Examiner*—Peter M. Cuomo
*Assistant Examiner*—Robert J. Sandy
*Attorney, Agent, or Firm*—Baker & Daniels

[57] ABSTRACT

A storage cabinet with an over the cabinet top door mechanism in which a biased track member assembly slides the cabinet door to an open and stored position over the cabinet top surface. A semi one-way clutch lid stay prevents sudden closure of the door eliminating slamming of the door against the cabinet during closure.

12 Claims, 4 Drawing Sheets

OVERHEAD STORAGE MECHANISM

BACKGROUND OF THE INVENTION

The present invention relates generally to wall mounted cabinets of the type employed in offices, modular work spaces and the like, and more particularly to wall mounted cabinets having a front door that opens over the cabinet.

In prior art wall cabinets with a stored door feature, the door generally slides to a stored position within the cabinet itself. Other kinds of cabinet door assemblies include over the cabinet assemblies such as shown in Alyworth U.S. Pat. No. 3,771,847 and its reissue, U.S. Pat. No. Re. 28994 which are hereby incorporated by reference. These patents disclose an over the cabinet door assembly for a wall mounted cabinet where the door is stored in a position overlying the top wall of the cabinet by lifting open the front door. These cabinets include a door slide that is hidden from view. This kind of cabinet has a drawback in that the mechanism neither assists in lifting the heavy front door nor prevents the slamming of the door during closure.

SUMMARY OF THE INVENTION

The present invention overcomes the aforementioned problems associated with prior art over the cabinet door assemblies by providing a biased track member to assist in door opening while further including a rotating lid stay that prevents the door from slamming shut.

Generally, the invention provides a cabinet having sidewalls, a bottom wall and a top wall on a door with a spring loaded slide means geared to the back surface of the door and a hinge, secured to the front edge of the top wall and to the slide mechanism, to thereby permit the door to slide to a stored position overlying the top wall. The slide mechanism includes a track attached to the door and a roller bearing carriage coacting with the track to provide relative movement therebetween. A spring is utilized to assist in door opening.

Additionally, the overhead cabinet door assembly includes a partial one-way opening clutch also known as a rotating lid stay that permits the door to easily move to its open position while preventing fast closing movement of the door.

An advantage of the overhead storage mechanism of the present invention is that the spring loaded track member assist in door opening thereby requiring less energy from office personnel to open the door.

Another advantage of the overhead storage mechanism of the present invention is that the rotating lid stay mechanism prevents the door from slamming shut thereby preventing smashed fingers and disruption in the office environment.

Yet another advantage of the overhead storage mechanism of the present invention is that the combination of the spring biased track member and rotating lid stay work independently from each other, minimally interfering with the action of opposite components.

The invention, in one form thereof, provides a cabinet having sidewalls, a bottom wall and a top wall defining a front opening, the cabinet including a door normally closing off the front opening. A semi one-way rotating lid stay member is secured to the door, the member rotatably attached to a side wall. A pair of track members are secured to the back side of the door in which is slidable a movable ball bearing door guide attached to the top wall of the cabinet. The door is slidably movable from a position closing off the front opening to a position overlaying the top wall. A spring attached between the door guide and the track is utilized to reduce the force necessary to open the door.

The lid stay includes a one way partial clutch constructed of a plurality of plates having openings. The plates selectively rotate through a viscous fluid whereby the clutch rotates relatively freely in one direction while rotation in an opposite direction is relatively restrained or reduced to prevent slamming of the door during closure. The openings in the plates permit or prevent rapid fluid flow causing a corresponding change in clutch rotation speed.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
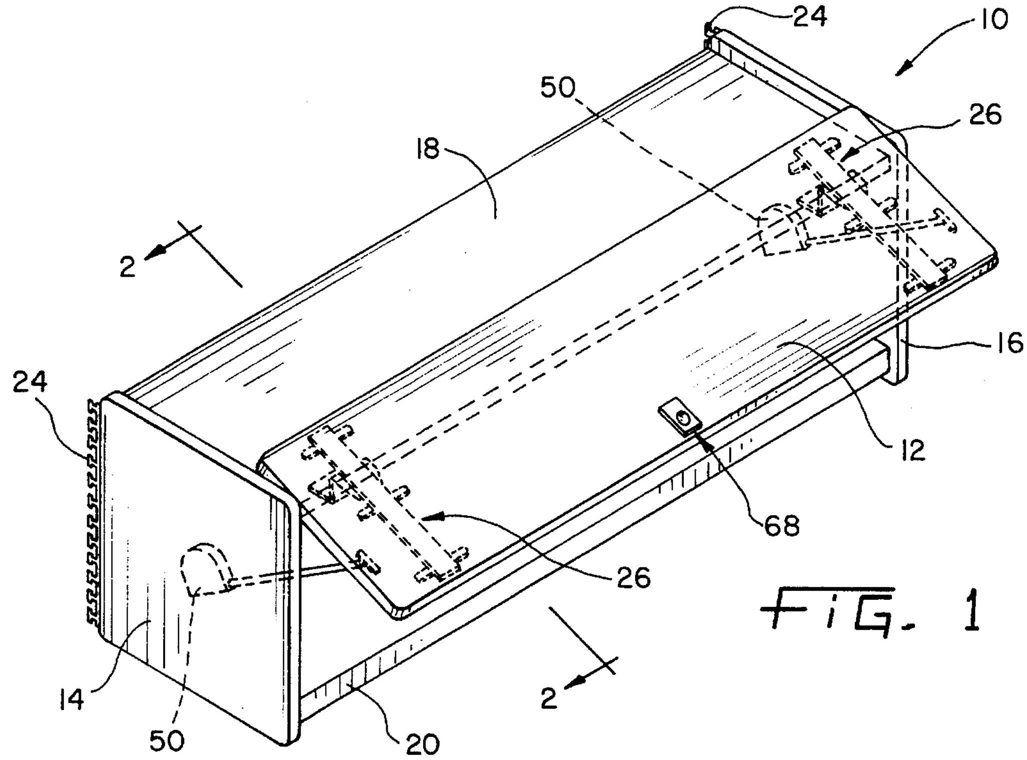
FIG. 1 is a perspective view of the cabinet incorporating the present invention.

An exemplary embodiment of the invention is shown in the drawings, and in particular by referring to FIG. 1, the wall mounted cabinet 10 of the invention is shown having a door 12 in a partially open position. Cabinet 10 includes a pair of sidewalls 14 and 16 to which top wall 18 and bottom wall 20 are firmly secured by known assembly techniques such as the use of screws, bolts, dowels and/or glue. The pair of sidewalls 14 and 16 and top and bottom walls 18 and 20 form a rectangular cabinet to which door 12 is attached and serves to close. A back wall 22 is additionally connected between all of the walls previously mentioned.

A mechanism is provided at the rearward edge of each of the sidewalls 14 and 16 to mount cabinet 10 of the present invention to a wall or spaced modular panel. Although any conventional mounting means may be employed for the cabinet of this invention, there is illustrated mounted to the rearward edge of walls 14 and 16 in FIG. 1, mounting brackets 24 which include a plurality of T-shaped hooks which are compatible with conventionally slotted standards employed in many modular work space dividing systems.

Figure 5:
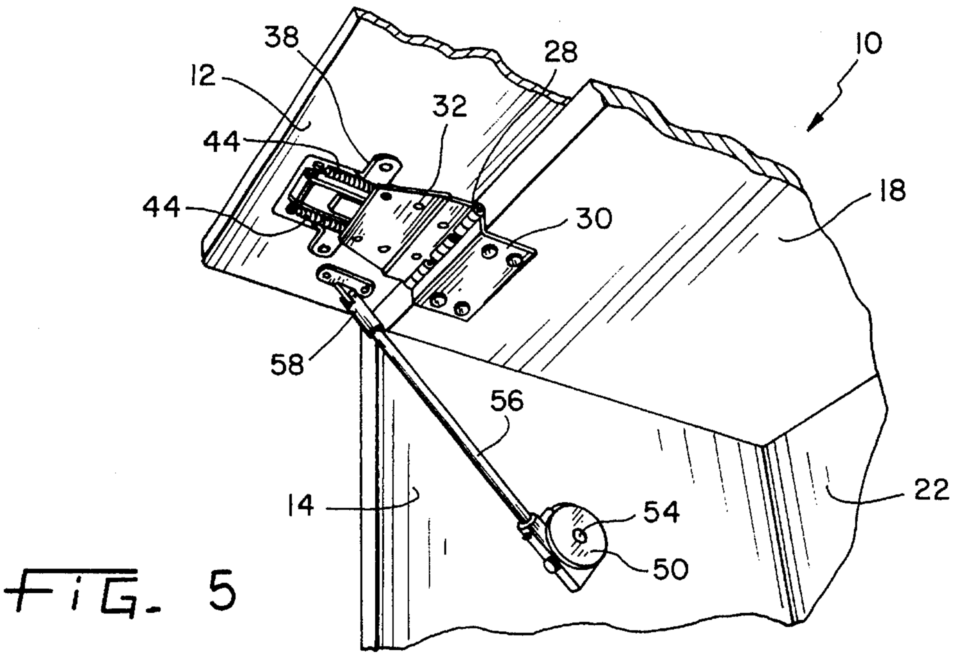
FIG. 5 is a perspective view of the cabinet of FIG. 4 showing the view of the present invention in a fully open position.

Door member 12 is affixed to the cabinet by means of a pair of combination spring loaded hinge and slide mechanisms 26. Each of the hinge and slide mechanisms 26 (FIGS. 5 and 6) include a hinge member 28 and a plate 30 secured to the front edge of the top wall 18 and a second plate 32 secured to a track member 34 having a ball bearing race 36. An outer fixed track member 38 is recessed into the back side of door 12 and extends to the full height of the door as is best seen in FIG. 1. A plurality of anti-friction bearings, such as ball bearings 40, are carried on ball bearing race 36 which locates balls 40 between track member 34 and outer track 38. The multi-track feature allows door member 12 to move in almost frictionless fashion from the closed position in FIG. 2 to the stored position in FIG. 5. The pair of spaced hinge and slide mechanisms 26 allow the cabinet door to be raised and moved to a stored position from any point along the door bottom from one end to the other. At each end of the fixed outer track member 38 is a raised stop or end 32 having a felt or similar bumper which serves to reduce impact when either end of the inner track member or ball carriage reaches the end of its travel against stop 42.

Figure 6:
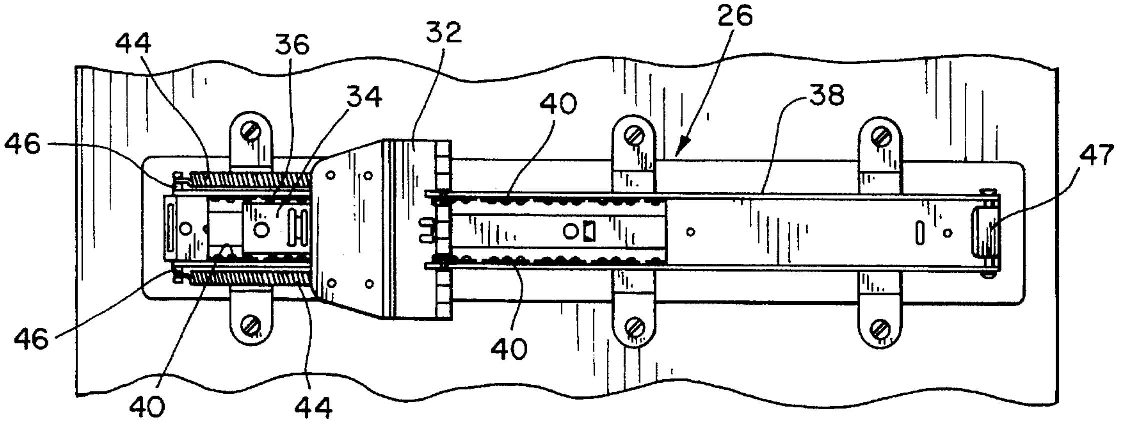
FIG. 6 is a fragmentary view of the cabinet door of FIG. 4 taken along line 6—6 in FIG. 4 and viewed in the direction of the arrows.

As shown in FIG. 6, the present invention includes the attachment of a biasing mechanism such as a coil spring 44 that attaches to an end post 46 at one end of outer track member 38 and also attaches to track member 34 particularly by posts extending away from second plate 32. Spring 44 permits use of the hinge and slide mechanism 26 with heavier weight doors 12 than previously accomplished. Alternatively, other types of springs other than coil springs may equivalently be utilized. The spring assist to the hinge and slide mechanism 26 effectively creates an easy open door arrangement. Hinge and slide mechanism 26 with the aforementioned spring 44 may be obtained from Knape and Vogt of Grand Rapids, Mich. Equivalently, spring 44 may be attached between door 12 and cabinet 10, or door 12 and first plate 30, to perform the necessary door assist function.

Figure 2:
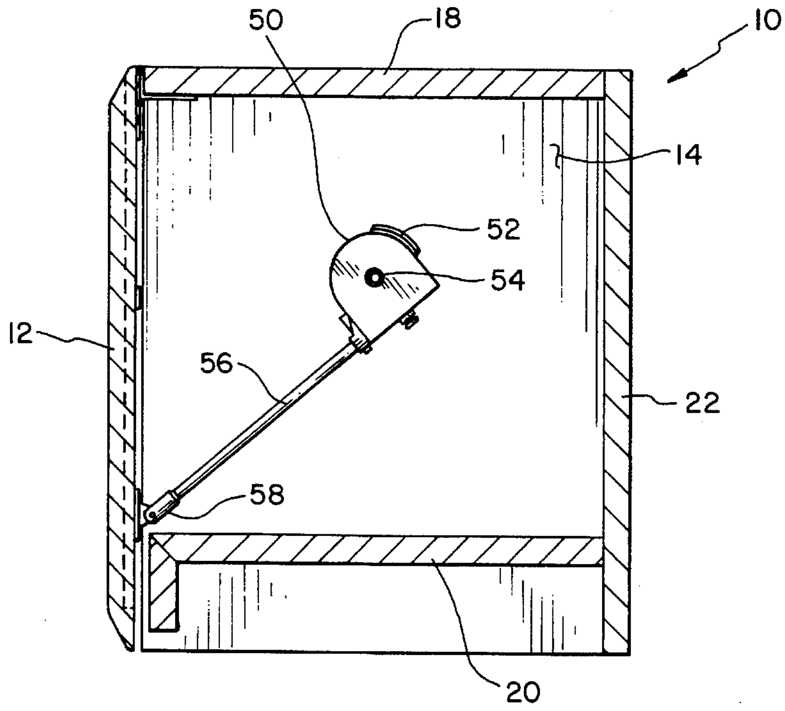
FIG. 2 is a sectional view of the cabinet of FIG. 1 taken along line 2—2 in FIG. 1 and viewed in the direction of the arrows.

The invention also includes use of a partial one way opening clutch or rotating lid stay 50 which permits door 12 to close without slamming. As shown in FIGS. 1 and 2, lid stay 50 is rotatably attached to a sidewall 14 or 16. A bracket 52, with an extending pivot point 54, is non-rotatingly attached to the sidewall 14 or 16 on which lid stay 50 rotates. Stay 50 includes an extending arm 56 that pivotally connects with door 12 by means of a pivot member 58.

Figure 7:
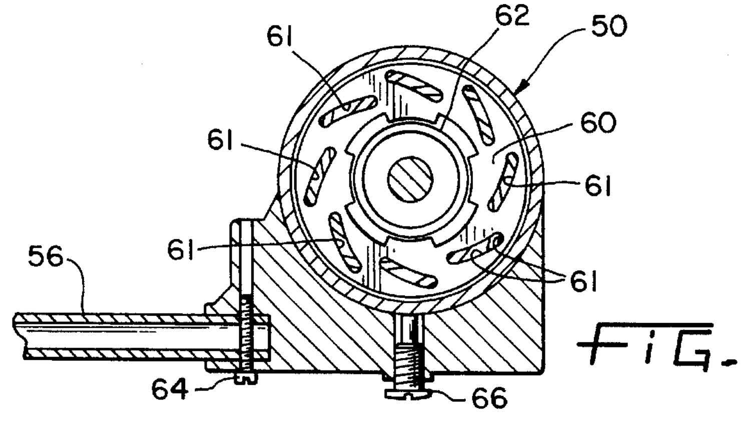
FIG. 7 is a cross sectional view of the partial one-way clutch or lid stay mechanism of the present invention.

The preferred lid stay 50, having a Model No. SDS-M obtainable from Sugatsune America, Inc., in Carson, Calif., operates to slow movement of door 12 by a flow of a viscous fluid past a plurality of notched laminations 60. As shown in FIG. 7, lid stay 50 includes a bushing 62 that connects with an extending point 54 with bracket 52. As lid stay 50 rotates about bracket 52, a selected number of laminations 60 rotate therewith in a viscous fluid which tends to allow movement of door 12 in the open direction while resisting movement of door closure. This feature of a slow or soft close of door 12 prevents door 12 from slamming against cabinet 10. Extending arm 56 is attached by connecting screw 64 to lid stay 50. FIG. 7 shows a speed adjustment screw 66 to adjust the resistance of lid stay 50 to rotation.

In operation, cabinet 10 will have a door in its fully closed position. Upon activation, a user will move door 12 away from cabinet 10 to disengage door 12 from bottom wall 20. As this happens, the user along with the bias spring 44 will cause the door to slide upward from cabinet 10 as track member 34 slides by ball bearings 40 through outer track member 38. As this happens, lid stay 50 will rotate in the clockwise direction as shown in the sequence of FIGS. 2–5. As shown in FIG. 7, notches or grooves 61 within lid stay 50 allow door 12 to move to its open position with substantially little resistance.

Figure 3:
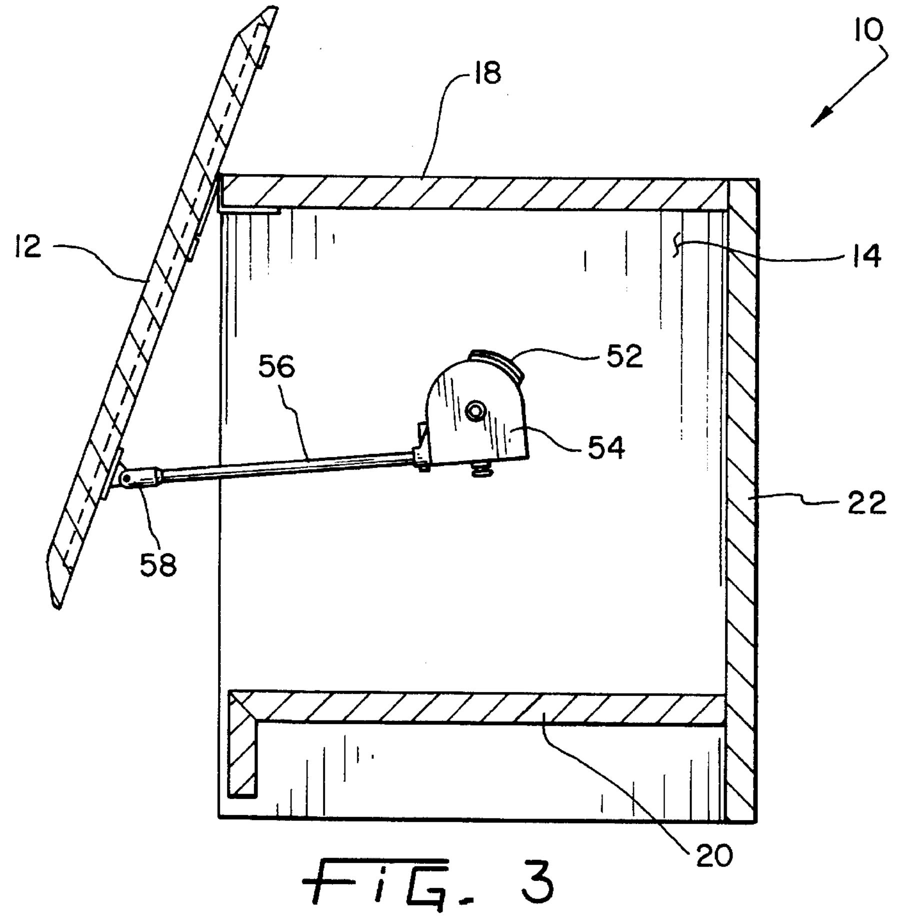
FIG. 3 is a sectional view of the cabinet of FIG. 2 with the door partially open.
Figure 4:
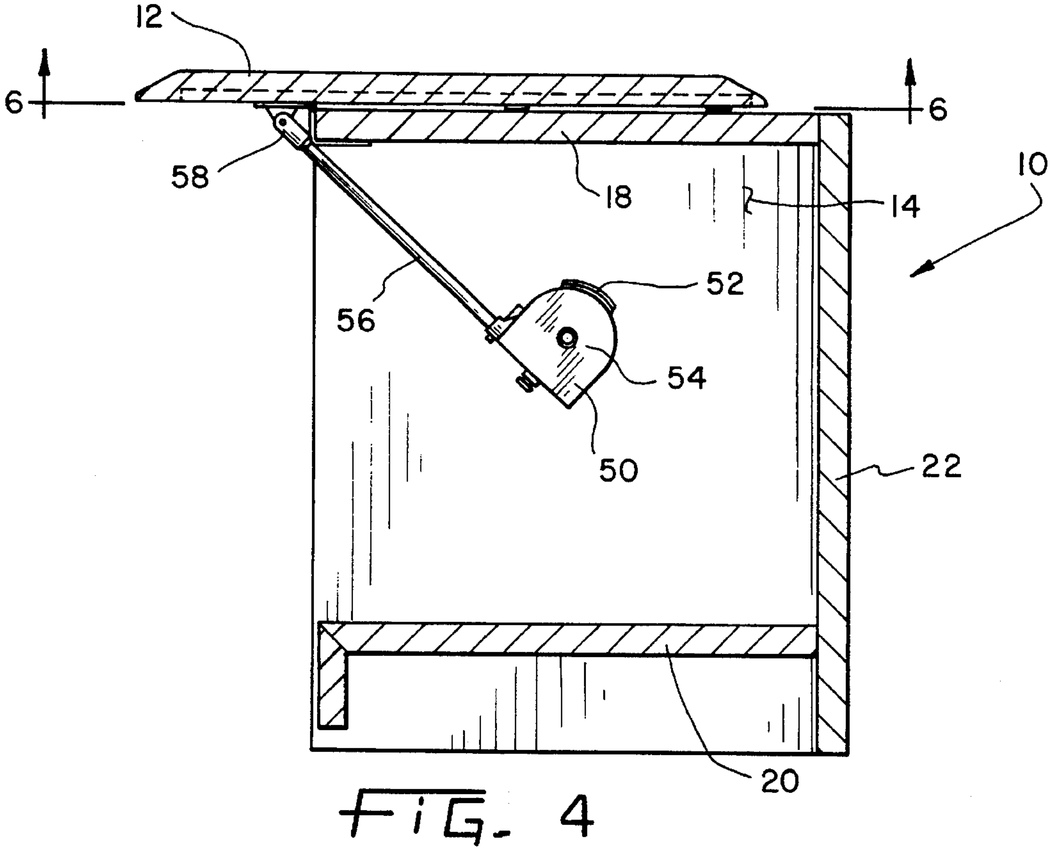
FIG. 4 is a sectional view of the cabinet of FIG. 2 with the cabinet door in its fully open position overlying the top wall of the cabinet.

During door closure, the operator will flip door 12 to a position similar to that shown in FIG. 3. While the user and gravity tend to cause door 12 to close quickly, the resistance against rotation in the closing direction provided by lid stay 50 via the rotation of laminations 60 within a viscous liquid, will slow the closure of door 12 thereby preventing slamming of the door.

Figure 8:
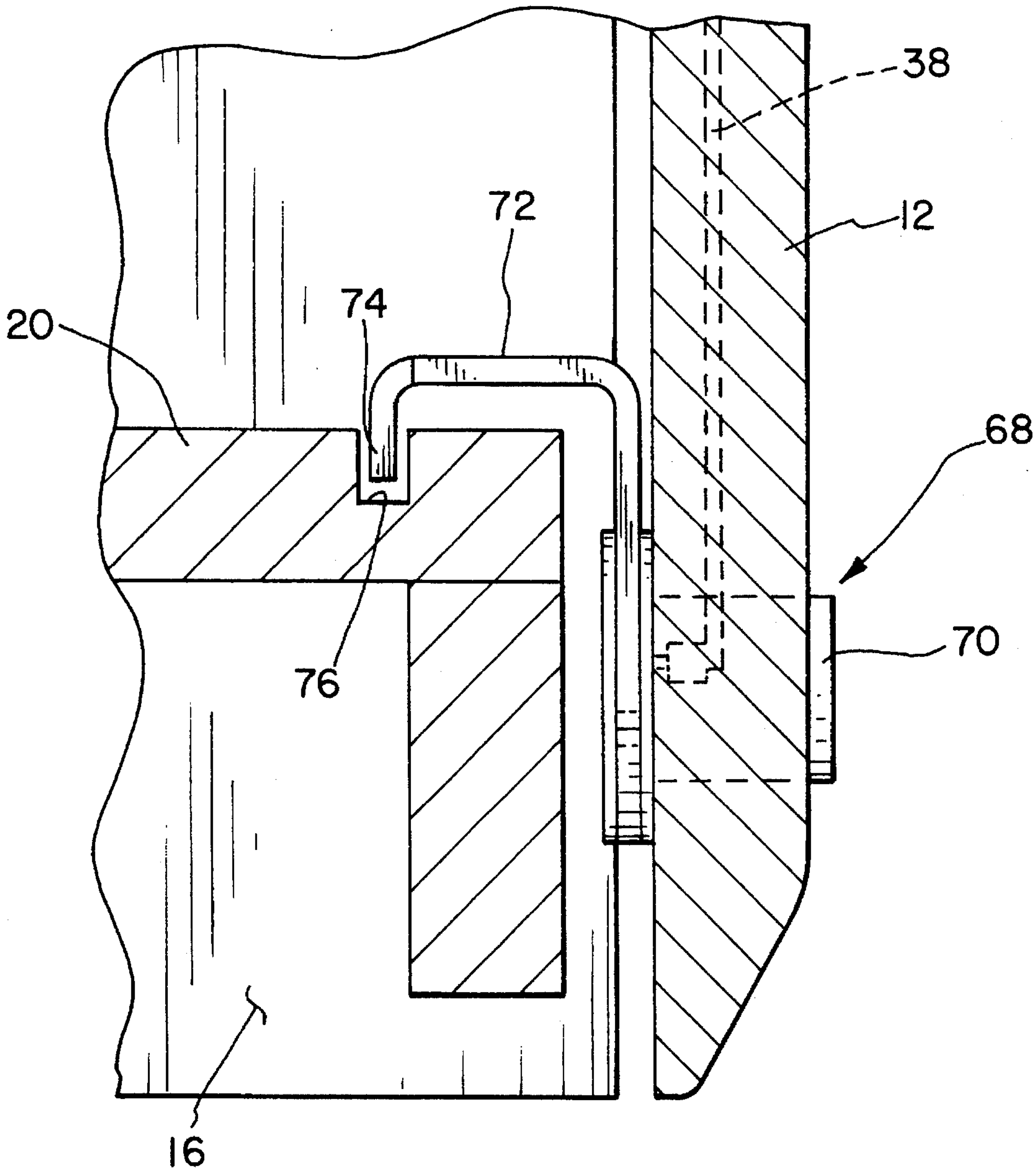
FIG. 8 is a cross sectional view of the lock mechanism shown in FIG. 1.

A lock 68 is provided on door 12 to prevent unauthorized personnel from opening the door. As shown in FIG. 8, lock 68 includes a standard key lock tumbler 70 attached through door 12. An upside down J-shaped locking flange 72 is operably attached to tumbler 70. A short curved end 74 of flange 72 interfits into a slot or bore 76 in bottom wall 20 to lock door 12 to cabinet 10 when tumbler 70 is in a locked mode. When a key is used to actuate and unlock tumbler 70, tumbler movement causes flange 72 to move away from bottom wall 20 thereby removing end 74 from bore 76. When end 74 has disengaged bore 76 and bottom wall 70, door 12 may be opened as discussed above.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A cabinet including side walls, a bottom wall and a top wall defining a front opening, said cabinet comprising:

a door normally closing said front opening and moveable to an open position above said top wall, said door having a front and a back;

a semi-one way rotating lid stay mechanism secured to said door, said member rotatably attached to one of said side walls; and a sliding door guide mechanism connected to said top wall and the back of said door, said guide mechanism including a bearing, whereby said door is moveable from a position closing off said front opening to a position overlying said top wall, said guide mechanism including a spring oriented to reduce the force necessary to open said door.

2. The cabinet of claim 1 in which said lid stay mechanism includes a one way partial clutch constructed of at least one plate with openings, said plate rotatable through a viscous liquid whereby said clutch rotates relatively freely in one direction while rotation in an opposite direction is relatively restrained.

3. A cabinet including side walls, a bottom wall and a top wall defining a front opening, said cabinet comprising:

a door normally closing off said front opening, said door having a front and a back;

a semi-one way rotating lid stay mechanism secured to said door, said mechanism rotatably attached to a said side wall;

a pair of track members secured to said back of said door; and a movable anti-friction bearing carrying door guide attached to said top wall and slidable between said track members, said door thereby being slidably movable from a position closing off said front opening to a position overlying said top wall;

said door guide including a spring to reduce the force necessary to open the door.

4. The cabinet of claim 3 in which said lid stay mechanism includes a one way partial clutch constructed of at least one plate with openings, said plate rotatable through a viscous liquid whereby said clutch rotates relatively freely in one direction while rotation in an opposite direction is relatively restrained.

5. The cabinet of claim 3 further comprising a lock mechanism having a tumbler attached to a J-shaped flange, said flange engaging said bottom wall to lock said door to said cabinet.

6. A cabinet including side walls, a bottom wall and a top wall defining a front opening, said cabinet comprising:

a door normally closing off said front opening, said door having a front and a back;

a semi-one way rotating lid stay mechanism secured to said door, said mechanism rotatably attached to a said side wall;

a pair of track members secured to said back of said door; and a movable anti-friction bearing carrying door guide attached to said top wall and slidable between said track members, said door thereby being slidably movable from a position closing off said front opening to a position overlying said top wall;

said door guide including a spring attached between said door guide and said track whereby the force necessary to open the door is reduced.

7. The cabinet of claim 5 in which said bottom wall includes a bore into which said flange engages.

8. A cabinet including side walls, a bottom wall and a top wall defining a front opening, said cabinet comprising;

a door normally closing off said front opening, said door having a front and a back;

a pair of lid stay mechanisms secured to said door, each said mechanism rotatably attached to a said side wall, wherein said mechanism rotates relatively freely in one direction and rotates relatively restrained in an opposite direction;

a pair of track members secured to said back of said door; and a movable anti-friction bearing carrying door guide attached to said top wall and slidable between said track members, said door thereby being slidably movable from a position closing off said front opening to a position overlying said top wall;

said door guide including a spring to reduce the force necessary to open the door.

9. The cabinet of claim 8 further comprising a lock mechanism having a tumbler attached to a J-shaped flange, said flange engaging said bottom wall to lock said door to said cabinet.

10. The cabinet of claim 9 in which said bottom wall includes a bore into which said flange engages.

11. A cabinet including side walls, a bottom wall and a top wall defining a front opening, said cabinet comprising:

a door normally closing off said front opening, said door having a front and a back;

a pair of lid stay mechanisms secured to said door, each said mechanism rotatably attached to a said side wall, wherein said mechanism rotates relatively freely in one direction and rotates relatively restrained in an opposite direction;

a pair of track members secured to said back of said door; and a movable anti-friction bearing carrying door guide attached to said top wall and slidable between said track members, said door thereby being slidably movable from a position closing off said front opening to a position overlying said top wall;

said door guide including a spring attached between said door guide and said track whereby the force necessary to open the door is reduced.

12. The cabinet of claim 11 in which each said lid stay mechanism includes a one way partial clutch constructed of at least one plate with openings, said plate rotatable through a viscous liquid whereby said clutch rotates relatively freely in one direction while rotation in an opposite direction is relatively restrained.

* * * * *